(12) United States Patent
Simeonov et al.

(10) Patent No.: US 11,680,478 B2
(45) Date of Patent: Jun. 20, 2023

(54) INTEGRATED COLLAR SENSOR FOR MEASURING PERFORMANCE CHARACTERISTICS OF A DRILL MOTOR

(71) Applicant: HALLIBURTON ENERGY SERVICES, INC., Houston, TX (US)

(72) Inventors: Svetozar D. Simeonov, Houston, TX (US); Pralay K. Das, Sugar Land, TX (US); Maxim Nikolayevich Yushko, Houston, TX (US); Michael Dewayne Finke, Cypress, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 0 days.

(21) Appl. No.: 16/645,462

(22) PCT Filed: Jun. 30, 2019

(86) PCT No.: PCT/US2019/040033
§ 371 (c)(1),
(2) Date: Mar. 7, 2020

(87) PCT Pub. No.: WO2021/002830
PCT Pub. Date: Jan. 7, 2021

(65) Prior Publication Data
US 2021/0404317 A1    Dec. 30, 2021

(51) Int. Cl.
*E21B 47/01* (2012.01)
*E21B 47/007* (2012.01)
(Continued)

(52) U.S. Cl.
CPC ............ *E21B 47/01* (2013.01); *E21B 47/007* (2020.05); *G01L 1/205* (2013.01); *G01L 1/22* (2013.01)

(58) Field of Classification Search
CPC ........ E21B 47/01; E21B 44/04; E21B 47/007; E21B 47/013; G01L 1/205
See application file for complete search history.

(56) References Cited

U.S. PATENT DOCUMENTS

| 4,359,898 A | 1/1982 | Tanguy et al. |
| 4,760,735 A | 8/1988 | Sheppard et al. |
| (Continued) | | |

FOREIGN PATENT DOCUMENTS

| JP | 2018021939 A | 2/2018 |
| KR | 101846560 B1 | 4/2018 |
| (Continued) | | |

OTHER PUBLICATIONS

English abstract of KR20130008483 from www.espacenet.com.
(Continued)

*Primary Examiner* — Jonathan Malikasim
(74) *Attorney, Agent, or Firm* — Novak Druce Carroll LLP

(57) ABSTRACT

Aspects of the subject technology relate to a sensor for a downhole tool. The downhole tool can include a collar and a sensor. The sensor can be secured to the collar for measuring one or more operational characteristics of the downhole tool during operation of the downhole tool including the performance characteristics of a drill motor. The sensor can include a substrate. The sensor can also include a plurality of strain gauges disposed on the substrate. The plurality of strain gauges can be configured to measure axial strains and torsional strains on the collar for measuring the one or more operational characteristics of the downhole tool.

18 Claims, 8 Drawing Sheets

(51) Int. Cl.
*G01L 1/20* (2006.01)
*G01L 1/22* (2006.01)

(56) References Cited

U.S. PATENT DOCUMENTS

| | | | |
|---|---|---|---|
| 4,805,449 A | 2/1989 | Das | |
| 4,949,575 A | 8/1990 | Rasmus | |
| 5,386,274 A | 1/1995 | Sanpe et al. | |
| 5,386,724 A * | 2/1995 | Das | E21B 47/007 |
| | | | 73/152.59 |
| 5,558,153 A * | 9/1996 | Holcombe | E21B 23/04 |
| | | | 166/373 |
| 6,068,394 A | 5/2000 | Dublin, Jr. | |
| 6,216,533 B1 | 4/2001 | Woloson | |
| 6,547,016 B2 | 4/2003 | Wassell | |
| 6,684,949 B1 | 2/2004 | Gabler et al. | |
| 6,951,137 B2 | 10/2005 | Smith et al. | |
| 6,957,575 B2 | 10/2005 | Boucher et al. | |
| 8,397,562 B2 | 3/2013 | Wassell et al. | |
| 8,733,438 B2 | 5/2014 | Kenison et al. | |
| 9,062,537 B1 * | 6/2015 | Holt | E21B 44/00 |
| 9,250,146 B2 | 2/2016 | Krans et al. | |
| 10,295,417 B2 * | 5/2019 | Hart | G01L 1/2206 |
| 11,137,300 B2 * | 10/2021 | Fleissner | G01L 1/2287 |
| 2009/0071645 A1 | 3/2009 | Kenison et al. | |
| 2011/0024188 A1 | 2/2011 | Wassell et al. | |
| 2015/0021016 A1 | 1/2015 | Deng et al. | |
| 2016/0090832 A1 | 3/2016 | Mock | |
| 2020/0340351 A1 * | 10/2020 | Harvey | E21B 44/04 |

FOREIGN PATENT DOCUMENTS

| | | |
|---|---|---|
| WO | 1997036084 A1 | 10/1997 |
| WO | 2015117149 A1 | 8/2015 |

OTHER PUBLICATIONS

English abstract of JP2018021939 from www.espacenet.com.
International Search Report and Written Opinion for International application No. PCT/US2019/040030, dated Mar. 26, 2020, 11 pages.
International Search Report and Written Opinion for International application No. PCT/US2019/040033, dated Mar. 26, 2020, 10 pages.
International Search Report and Written Opinion for International application No. PCT/US2019/040035, dated Mar. 30, 2020, 11 pages.
International Search Report and Written Opinion for International application No. PCT/US2019/040037, dated Mar. 30, 2020, 11 pages.

* cited by examiner

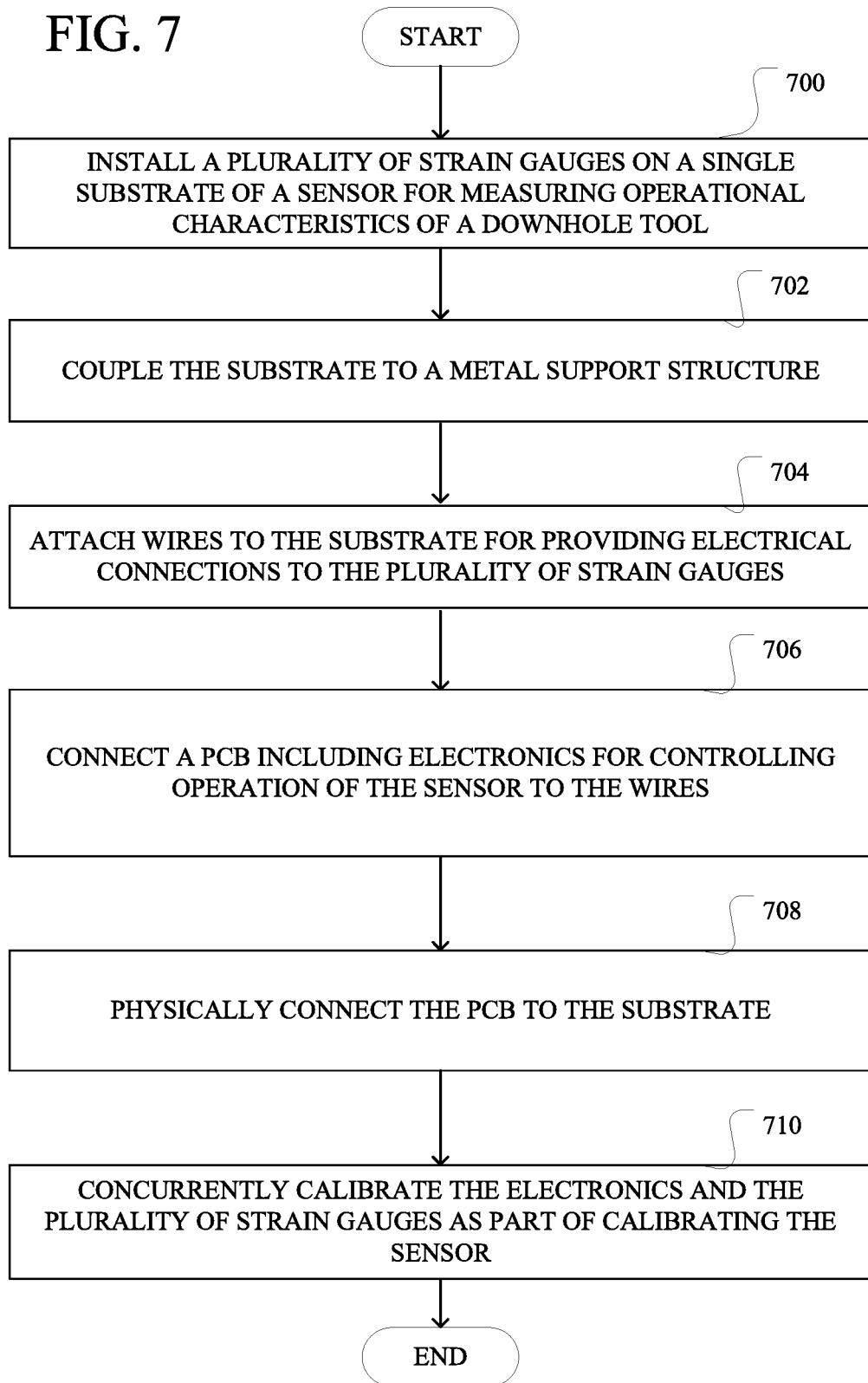

INTEGRATED COLLAR SENSOR FOR MEASURING PERFORMANCE CHARACTERISTICS OF A DRILL MOTOR

CROSS-REFERENCE TO RELATED APPLICATIONS

This application is a national stage entry of PCT/US2019/040033 filed Jun. 30, 2019, said application is expressly incorporated herein in its entirety.

TECHNICAL FIELD

The present technology pertains to a sensor for a downhole tool, and more particularly, to an integrated collar sensor for measuring operational characteristics of the downhole tool.

BACKGROUND

Certain rotary drilling systems and downhole tools, such as those used in the production of oil and gas, may utilize sensors disposed in a collar of a drilling string to ascertain data relating to a cutting bit of the drill string. Sensors that measure weight-on-bit provide data that may be used to control the drilling of a well. The weight is applied to the bit by a string of heavy collars that can be attached immediately above the bit and suspended in the borehole on smaller diameter drill pipe. Weight-on-bit may also be used to optimize the rate that the bit penetrates a particular type of earth formation, as well as the rate of bit wear.

Sensors may also measure torque-on-bit providing information that may be used to estimate the degree of wear of the bit, particularly when considered together with measurements of weight-on-bit. Excessive torque may be indicative of serious bit damage such as bearing failure and locked cones.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIG. 7 illustrates an example method for manufacturing a sensor for a downhole tool, in accordance with various aspects of the subject technology.

DETAILED DESCRIPTION

Figure 1A:
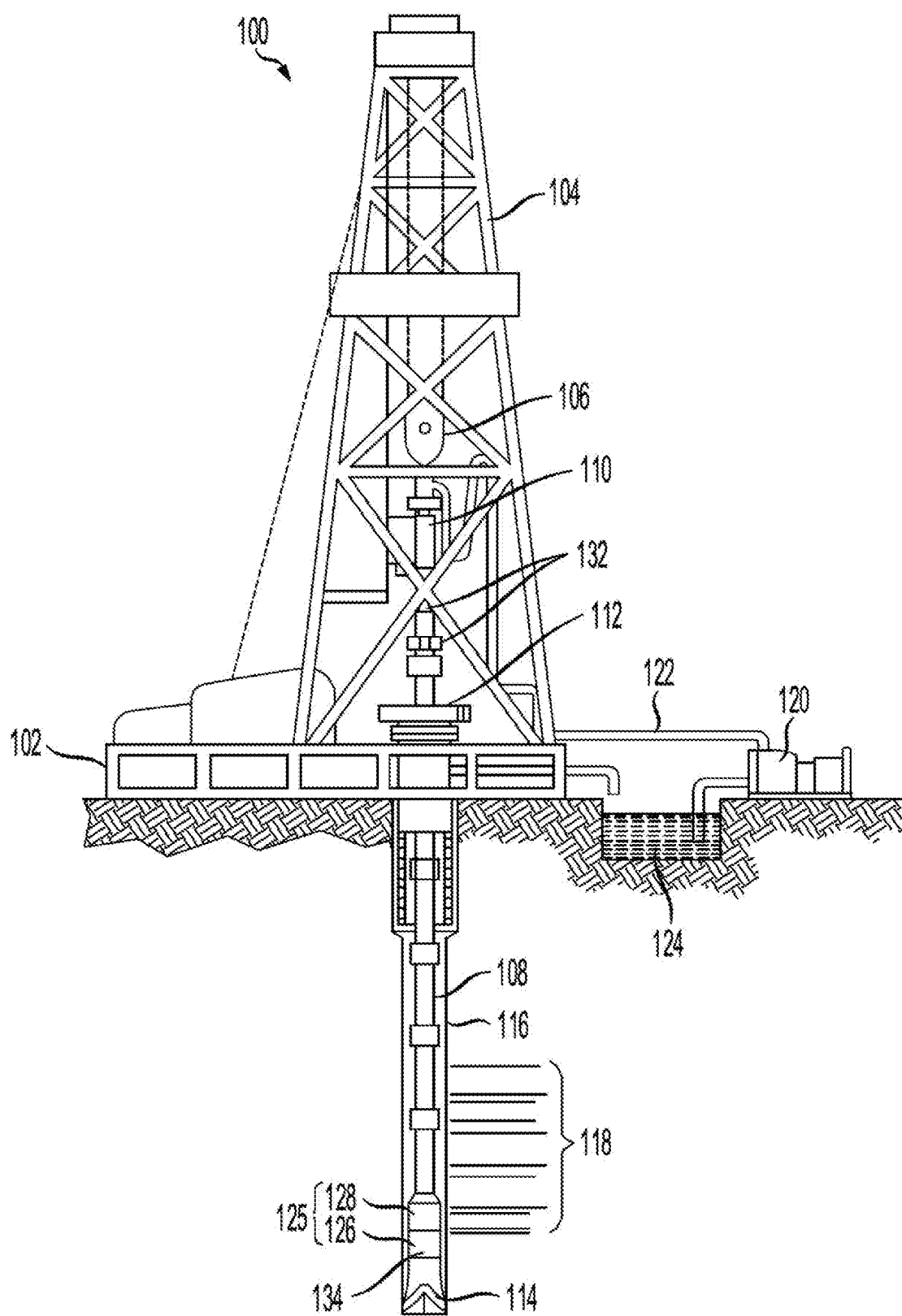
FIG. 1A is a schematic diagram of an example logging while drilling (LWD) wellbore operating environment, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Certain rotary drilling systems, such as those used in the production of oil and gas, may utilize sensors disposed in a collar of a drilling string of a downhole tool to detect data relating to a cutting bit of the drill string. Sensors that measure weight-on-bit provide data that may be used to control the drilling of a well. Sensors may also measure torque-on-bit providing information that may be used to estimate the degree of wear of the bit, particularly when considered together with measurements of weight-on-bit.

Sensors placed on the collar and proximal to the bit itself, may provide more accurate measurements. Current sensor configurations for collars are formed through a plurality of gauges disposed manually and separately, e.g. on different substrates, in the collars. This is disadvantageous as the gauges have to be individually calibrated through multiple tests, e.g. the same test run multiple times with varying parameters. In turn, this increases the time and costs associated with testing current sensor configurations for implementation in a downhole tool. Accordingly, there is a need for a sensor that includes a plurality of gauges integrated into a single substrate of a sensor.

In current sensor configurations for collars, printed circuit boards (PCBs) and associated circuitry are typically integrated separate from the sensors, often at positions far away from gauges on a collar. This is problematic as the large distance between the PCB and the sensors can degrade measurements made by the sensors. Specifically, large distances between the PCB and the sensors can introduce noise in signals transmitted to and from the gauges, thereby degrading measurements made by the sensors. Accordingly, there is a need for a sensor that integrates a PCB, and associated circuitry, within the sensor to position the PCB close to gauges included as part of the sensor.

Additionally, in current sensor configurations for collars, temperature sensors are typically integrated on a collar separate from sensors and other gauges that measure operational characteristics of a downhole tool. This is problematic as accurate temperature readings at the sensors and gauges are often necessary to accurately measure the operational characteristics of the downhole tool. Accordingly, there is a need for a collar sensor that integrates a temperature sensor within the collar sensor to accurately measure temperatures at the gauges included as part of the collar sensor.

Further, in downhole tools bending of the downhole tool is an important operational parameter to monitor during operation of the downhole tool. However, bending moments of a downhole tool can be difficult to accurately measure. Specifically, accurately measuring bending moments of a downhole tool using sensors for measuring weight-on-bit and torque-on-bit through a collar can be difficult. Accordingly, there is a need for sensor configurations within a collar capable of accurately measuring bending moments of a downhole tool.

The disclosed technology addresses the foregoing by integrating a plurality of gauges on a single substrate of a sensor. Further, the disclosed technology addresses the foregoing by integrating a PCB within the sensor in proximity to the substrate supporting the plurality of gauges. Additionally, the disclosed technology addresses the foregoing by integrating a temperature sensor on the PCB within the sensor in proximity to the substrate supporting the plurality of gauges. The disclosed technology also addresses the foregoing by integrating two sensors positioned 180° apart along a circumference of a collar to accurately measure bending moments of a downhole tool.

In various embodiments, a downhole tool is provided. The downhole tool can comprise a collar. The downhole tool can also comprise a sensor secured to the collar for measuring one or more operational characteristics of the downhole tool during operation of the downhole tool. The sensor can include a substrate and a plurality of strain gauges disposed on the substrate. The strain gauges can be configured to measure axial loads and torsional loads on the collar that are transferred to the substrate for measuring the one or more operational characteristics of the downhole tool.

In various embodiments, a sensor for a downhole tool is provided. The sensor can comprise a substrate configured for positioning on a collar of the downhole tool. The sensor can also comprise a plurality of strain gauges disposed on the substrate. The plurality of strain gauges can be configured to measure axial loads and torsional loads on the collar that are transferred to the substrate for measuring one or more operational characteristics of the downhole tool during operation of the downhole tool. The one or more operational characteristics of the downhole tool can include weight-on-bit and torque-on-bit of the downhole tool determined from the axial loads and the torsional loads on the collar measured by the plurality of strain gauges.

In various embodiments, a method for fabricating a sensor for a downhole tool is provided. The method can include installing a plurality of strain gauges on a single substrate of the sensor, wherein the sensor is configured to measure axial loads and torsional loads on a collar when the sensor is secured to the collar for measuring one or more operational characteristics of the downhole tool. Further, the method can include coupling the substrate to a metal support structure. The method can also include attaching wires to the substrate coupled to the metal support structure for providing electrical connections to the plurality of strain gauges. Further, the method can include connecting a printed circuit board (PCB) including electronics for controlling operation of the sensor in measuring the one or more operational characteristics of the downhole tool to the wires. Additionally, the method can include physically connecting the PCB to the substrate. The method can also include concurrently calibrating the electronics and the plurality of strain gauges as part of calibrating the sensor.

Turning now to FIG. 1A, a drilling arrangement is shown that exemplifies a Logging While Drilling (commonly abbreviated as LWD) configuration in a wellbore drilling scenario 100. Logging-While-Drilling typically incorporates sensors that acquire formation data. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 132 and to receive commands from the surface. In at least some cases, the telemetry sub 128 communicates with a surface receiver 132 using mud pulse telemetry. In some instances, the telemetry sub 128 does not communicate with the surface, but rather stores logging data for later retrieval at the surface when the logging assembly is recovered.

Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

In at least some instances, one or more of the logging tools 126 may communicate with a surface receiver 132 by a wire, such as wired drill pipe. In other cases, the one or more of the logging tools 126 may communicate with a surface receiver 132 by wireless signal transmission. In at least some cases, one or more of the logging tools 126 may receive electrical power from a wire that extends to the surface, including wires extending through a wired drill pipe.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
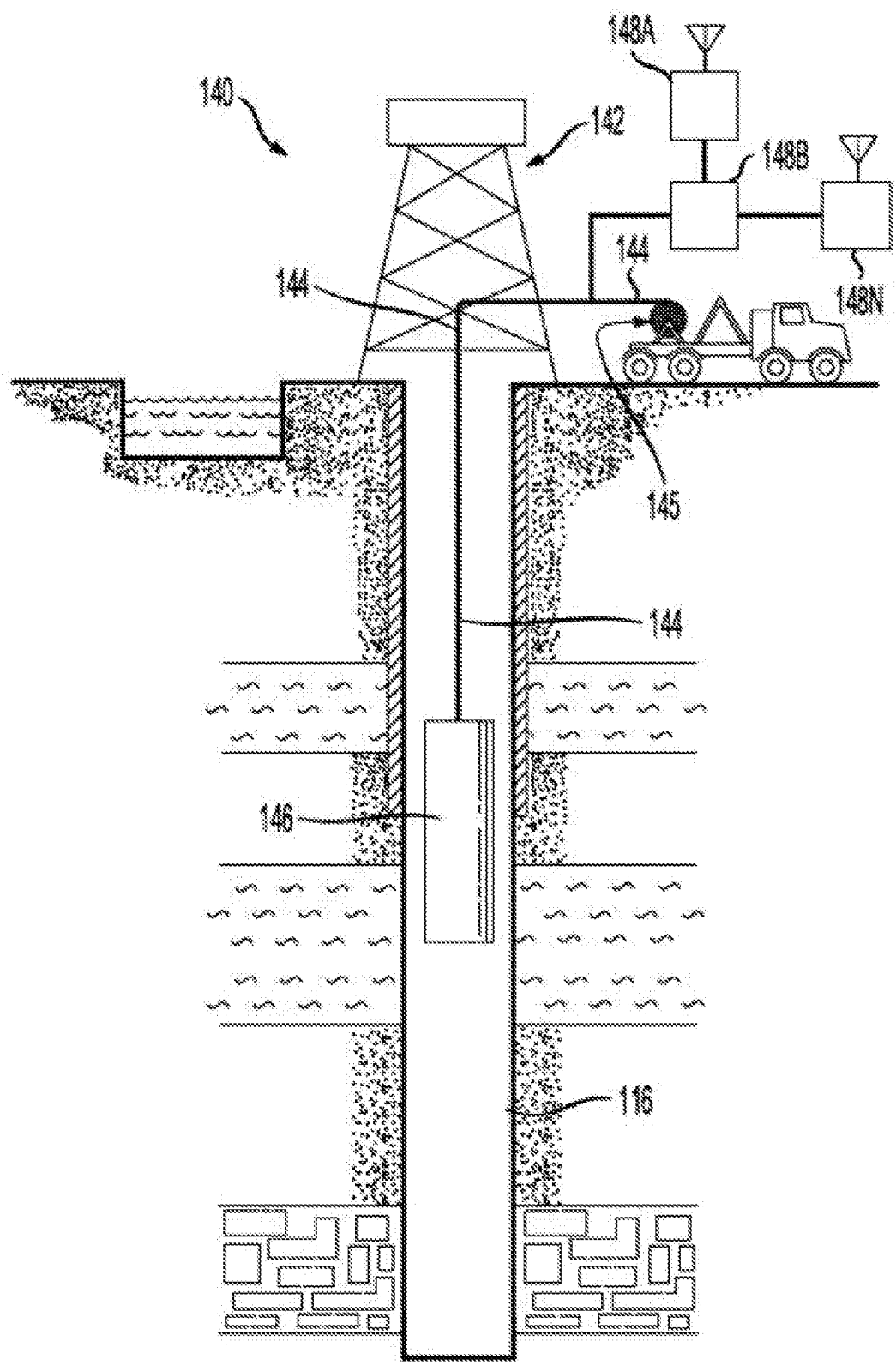
FIG. 1B is a schematic diagram of an example downhole environment having tubulars, in accordance with some examples, in accordance with various aspects of the subject technology.

Referring to FIG. 1B, an example system 140 for downhole line detection in a downhole environment having tubulars can employ a tool having a tool body 146 in order to carry out logging and/or other operations. For example, instead of using the drill string 108 of FIG. 1A to lower tool body 146, which may contain sensors or other instrumentation for detecting and logging nearby characteristics and conditions of the wellbore 116 and surrounding formation, a wireline conveyance 144 can be used. The tool body 146 can include a resistivity logging tool. The tool body 146 can be lowered into the wellbore 116 by wireline conveyance 144. The wireline conveyance 144 can be anchored in the drill rig 145 or a portable means such as a truck. The wireline conveyance 144 can include one or more wires, slicklines, cables, and/or the like, as well as tubular conveyances such as coiled tubing, joint tubing, or other tubulars.

The illustrated wireline conveyance 144 provides support for the tool, as well as enabling communication between tool processors 148A-N on the surface and providing a power supply. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more processors 148A-N, which can include local and/or remote processors. Moreover, power can be supplied via the wireline conveyance 144 to meet power requirements of the tool. For slickline or coiled tubing configurations, power can be supplied downhole with a battery or via a downhole generator.

Figure 2:
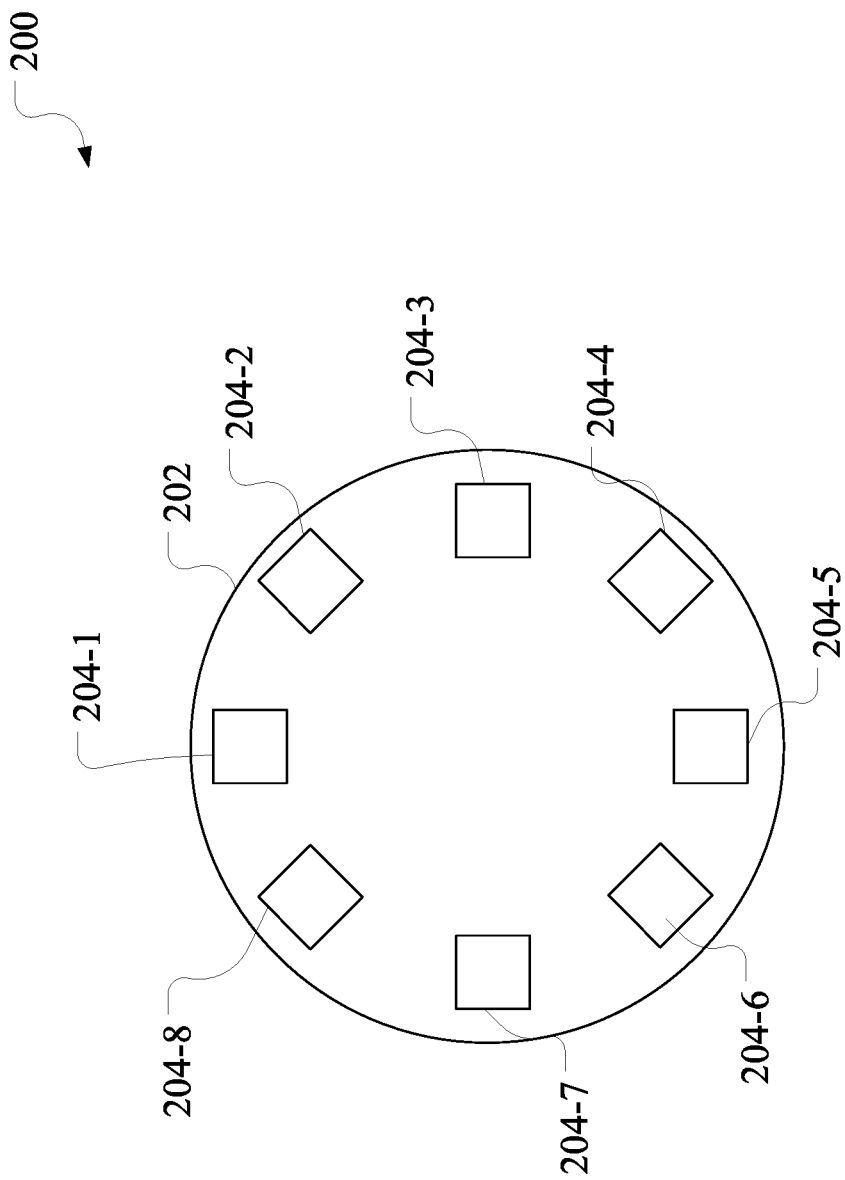
FIG. 2 is a schematic diagram of an example sensor, in accordance with various aspects of the subject technology.

FIG. 2 is a schematic diagram of an example sensor 200, in accordance with various aspects of the subject technology. The sensor 200 can be configured for positioning on or within a collar of a downhole tool and/or tool body. As follows, the sensor 200 can be used to measure operational characteristics of the downhole tool during operation of the downhole tool.

Operational characteristics of the downhole tool include applicable characteristics related to operation of the downhole tool. For example, and as will be discussed in greater detail later, operational characteristics of the downhole tool can include a weight-on-bit and torque-on-bit of the downhole tool. In another example, and as will be discussed in greater detail later, operational characteristics of the downhole tool can include a bending moment of the downhole tool.

The sensor 200 includes a substrate 202. The substrate 202 can be fabricated from an applicable material for supporting gauges and other applicable components in the sensor 200. Further, the substrate 202 can be shaped for securing the sensor 200 to the collar of the downhole tool. For example, the substrate 202 can be shaped to fit within a cavity of the collar to secure the sensor 200 to the collar during operation of the downhole tool. In being secured to the downhole tool, loads on the downhole tool, e.g. axial and torsional loads, can be transferred to the sensor 200 through the substrate 202. The sensor 200 can then measure the loads on the downhole tool that are transferred to the sensor 200 through the substrate 202.

The sensor 200 includes a plurality of gauges, 204-1 . . . 204-8, herein referred to as gauges 204, disposed on the substrate 202. While eight gauges are shown in the example sensor 200, the sensor 200 can include more or fewer gauges, e.g. depending on the type of measurements made by the gauges and the type of gauges used. The gauges 204 can be positioned on the substrate 202 at specific angles with respect to each other. Specifically, the plurality of gauges can be circumferentially spaced approximately 45° apart from each other about a circumference of the substrate 202. For example, the plurality of gauges can be circumferentially spaced 45° + or − a range of 10° apart from each other about a circumference of the substrate.

The strain gauges 204 can be configured, e.g. operate in combination, to measure both axial and torsional loads on the collar when the sensor is integrated with the collar. Specifically, each of the strain gauges 204 can be orientated and integrated within the substrate 202 so that the sensor 200 is configured to measure both axial and torsional loads on the collar. More specifically, the strain gauges 204, in combination, can effectively form two full-bridge strain gauges within the sensor 200 to measure both axial and torsional loads. A full-bridge strain gauge is a strain gauge that includes four individual strain gauges orientated and/or positioned differently to measure strain, while reducing the effects of temperature on strain measurements. The strain gauges 204 can measure axial and torsional loads on the collar and the corresponding downhole tool during operation of the downhole tool. As follows, the axial and torsional loads can be used to measure both weight-on-bit and torque-on-bit of the downhole tool. While strain gauges are discussed throughout this paper, the sensors can be integrated with gauges other than strain gauges. Further, while specific reference is made to measuring weight-on-bit and torque-on-bit of the downhole tool, the strain gauges 204 can be used to measure other applicable operational characteristics associated with the downhole tool, the downhole assembly, and/or an environment of the downhole tool and the downhole tool assembly. For example, and as will be discussed in greater detail below, the strain gauges 204 can be used to identify bending moments in the downhole tool.

The strain gauges 204 can be used to measure formation parameters of a medium in which the downhole tool is operating. Specifically, weight-on-bit and torque-on-bit, as measured by the strain gauges 204, can be used to identify a mechanical impedance of the downhole tool. In turn, the mechanical impedance of the downhole tool can be used to measure formation parameters of a medium. Formation parameters of a medium that a downhole tool is operating in, as determined from the mechanical impedance of the downhole tool, can include applicable characteristics of the medium. For example, formation parameters of the medium can include a compressive strength of the medium, a porosity of the medium, a shear strength of the medium, and a modulus of elasticity of the medium. Specifically, a decrease in both torque-on-bit and weight-on-bit, or an increase in rate of penetration (ROP), as measured by the strain gauges 204, can indicate that the porosity of the medium is increasing.

Further, the strain gauges 204 can be used to measure performance/efficiency of a drill motor of the downhole tool. The drill motor may be, for example, a mud motor that uses hydraulic horsepower of the drilling fluid to drive the drill bit. A mud motor may be used to provide additional torque to the drill bit when drilling. Specifically, a torque-on-bit, as measured by the strain gauges 204, can be compared to a known operational torque of the drill motor to determine how the drill motor is performing. For example, if a measured torque-on-bit is lower than a known operational torque of the drill motor, then it can be determined that the motor is not performing efficiently, e.g. is failing. A known operational torque of the drill motor can be an assumed operational torque of the drill motor, e.g. based on a starting operational torque during operation of the drill motor. Further, a known operational torque of the drill motor can be identified during operation of the drill motor. For example, a known operational torque of the drill motor can be identified based on a pressure drop within a wellbore during operation of the drill motor.

Additionally the strain gauges 204 can be used to measure health of the downhole tool and components of the downhole tool. Specifically, the strain gauges 204 can detect indications of wear and tear on a bit of the downhole tool. More specifically, the strain gauges 204 can be used to measure a rate of penetration of the downhole tool. In turn, the rate of penetration can indicate an amount of wear and tear on a drill bit. For example, a dropping rate of penetration can indicate that the drill bit is beginning to fail due to wear and tear. Further, the wear and tear on the bit can be measured by the strain gauges 204 based on measured torque-on-bit compared to measured weight-on-bit. For example, a dropping torque-on-bit under a constant weight-on-bit can indicate that the drill bit is beginning to fail due to wear and tear. Additionally, curvature in the downhole tool can be identified based on observed bending moments and measured weight-on-bit. For example, as the weight-on-bit increases, observed bending moments can indicate that the downhole tool is experiencing bending due to curvature.

In configuring the sensor 200 for operation within the downhole tool, each of the strain gauges 204 can be concurrently tested through one or more tests to calibrate the strain gauges 204 and the sensor 200. Specifically, as the strain gauges 204 are disposed together on the substrate 202, the strain gauges 204 can all be subjected to the same test, e.g. concurrently, in order to calibrate the strain gauges 204 and the sensor 200. For example, a single weight test can be applied to all of the strain gauges 204 in order to calibrate the strain gauges 204. This is advantageous over typical sensors that include multiple strain gauges manually positioned separate from each. Specifically, in conventional sensors used in downhole tools, the strain gauges are not on the same substrate. As a result, each strain gauge has to be individually tested separately from the other stain gauges leading to multiple applications of the same test, e.g. the same test with varying parameters. In turn, this increases costs and times associated with assembling and calibrating the sensors. Tests used to calibrate the strain gauges 204 and the sensor 200 can include applicable tests for calibrating a sensor to make operational measurements of a downhole tool. For example, tests used to calibrate the strain gauges 204 and the sensor 200 can include a weight test, a bend test, a torque test, a pressure test, and a temperature test.

Figure 3:
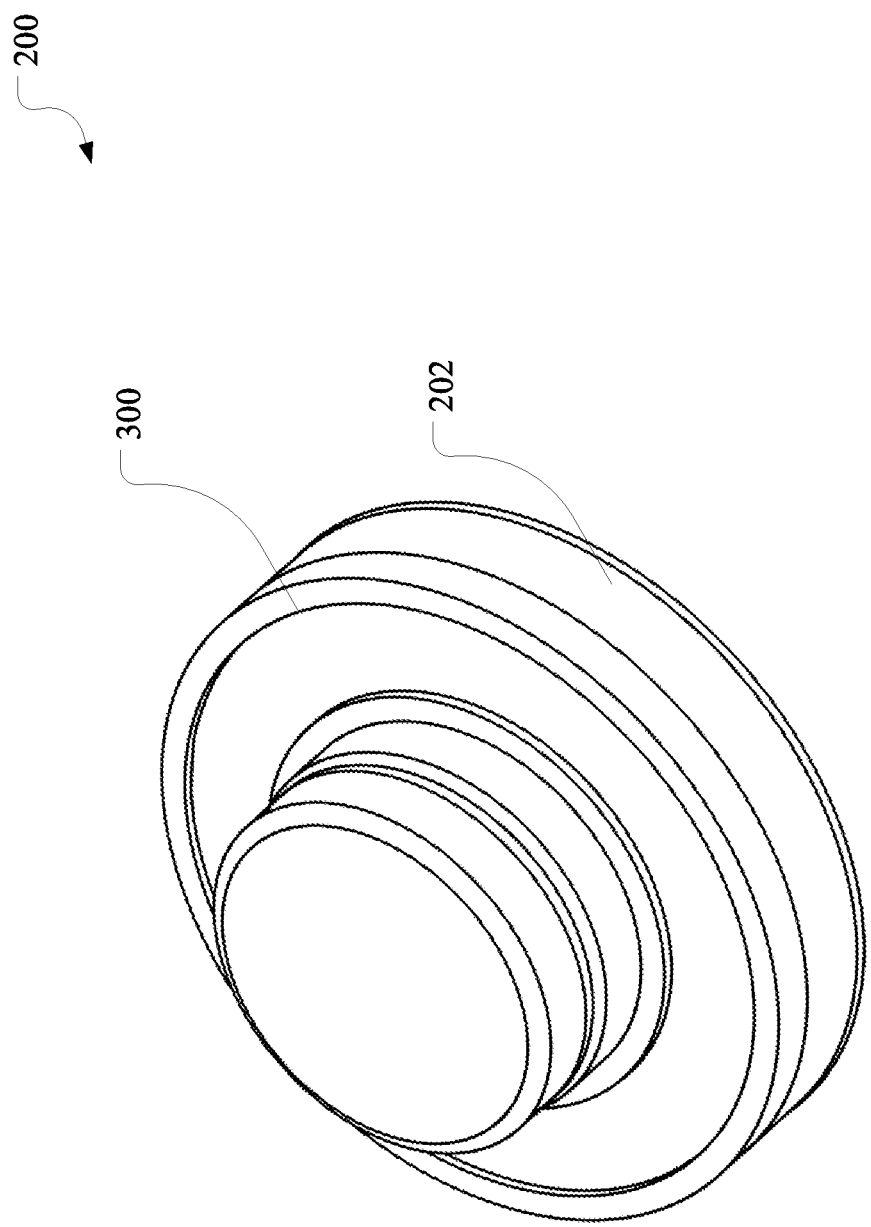
FIG. 3 shows a perspective view of the sensor, in accordance with various aspects of the subject technology.

FIG. 3 shows a perspective view of the sensor 200, in accordance with various aspects of the subject technology. As discussed with respect to FIG. 2, the sensor 200 includes the substrate 202. The sensor 200 also includes a PCB 300 positioned within the sensor 200 in proximity to the substrate 202. Although not shown in FIG. 3, the strain gauges 204 are disposed on the substrate 202. Accordingly, the PCB 300 can be positioned in proximity to the strain gauges and connected to the strain gauges with wires. The PCB 300 can be permanently attached to the substrate 202 within the sensor 200. Specifically, a bottom surface of the PCB 300 can be glued to or otherwise affixed to a top surface of the substrate 202, e.g. a surface upon which the strain gauges are disposed.

The PCB 300 includes electronics, e.g. analog-to-digital converter, memory, and control circuitry, for calibrating and controlling operation of the sensor 200 in measuring one or more operational characteristics of the downhole tool. Further, the PCB 300 and the corresponding electronics are electrically coupled to the strain gauges for calibrating and controlling operation of the strain gauges. Specifically, the electronics can be used to apply biases and scale factors, e.g. as part of calibration parameters, to the strain gauges for calibrating and controlling operation of the strain gauges. Specifically, the electronics can apply biases and scale factors based on measured temperatures at the strain gauges to control operation of the strain gauges. The electronics can also support communication between the strain gauges, e.g. between the strain gauges in operating to measure axial and torsional loads. Specifically, the electronics can allow for communication between two full-bridge strain gauges formed by the strain gauges in the sensor 200.

Integrating the PCB 300 with the substrate 202 and the strain gauges within the sensor 200 can lead to improved measuring accuracy by the strain gauges in measuring axial and torsional loads. Specifically, in being implemented within the sensor 200, the PCB 300 is in close proximity to the strain gauges. This shortens the length of wires between the circuitry and the strain gauges, e.g. when compared to sensors that do not integrate a PCB and circuitry within the sensor. In turn, the amount of noise created in signals transmitted between the strain gauges and the circuitry is reduced, thereby improving the accuracy of the strain gauges in measuring axial and torsional loads.

Further, by integrating the PCB 300 within the sensor 200, the circuitry on the PCB 300 and the strain gauges can be calibrated and tested together. Specifically, the sensor 200, e.g. the strain gauges and the circuitry, can be calibrated and tested before it is integrated with the collar. Therefore, if the sensor 200 is faulty, it can be repaired or discarded before it is actually integrated with the collar. This is advantageous over typical sensors that are tested and calibrated after installation on a collar.

In calibrating the circuitry and the strain gauges together, calibration parameters of the strain gauges, e.g. biases, scale factors, and thermal calibrations, for configuring and controlling the strain gauges can be identified. The identified calibration parameters can be stored in the circuitry on the PCB 300 for configuring and controlling operation of the strain gauges. Specifically, the calibration parameters can be stored in the circuitry before the sensor 200 is installed in the collar. Accordingly, the sensor 200 can be operationally coupled to the collar without the need to further calibrate the sensor 200 and the strain gauges. This facilitates the use of the sensor 200 across a variety of different downhole tools with little or no additional calibration.

The PCB 300 can also include a temperature sensor. As the PCB 300 is integrated as part of the sensor 200 in close proximity to the strain gauges, the temperature sensor can effectively measure the temperature at the strain gauges. Specifically, the close proximity between the temperature sensor and the strain gauges can lead to a shortened or non-existent thermal gradient between the temperature sensor and the strain gauges. As follows, temperature measurements made by the temperature sensor can more accurately reflect actual temperatures at the strain gauges. This is important, as the strain gauges can be configured and controlled based on measured temperatures at the strain gauges. Specifically, the circuitry on the PCB 300 can be programmed, e.g. through stored calibration parameters, to configure and control the strain gauges based on the measured temperatures at the strain gauges. Therefore, using more accurate temperature measurements at the strain gauges, as taken by the temperature sensor integrated as part of the PCB 300, can help to ensure that the strain gauges are properly configured and controlled for accurately measuring axial and torsional loads.

Figure 4:
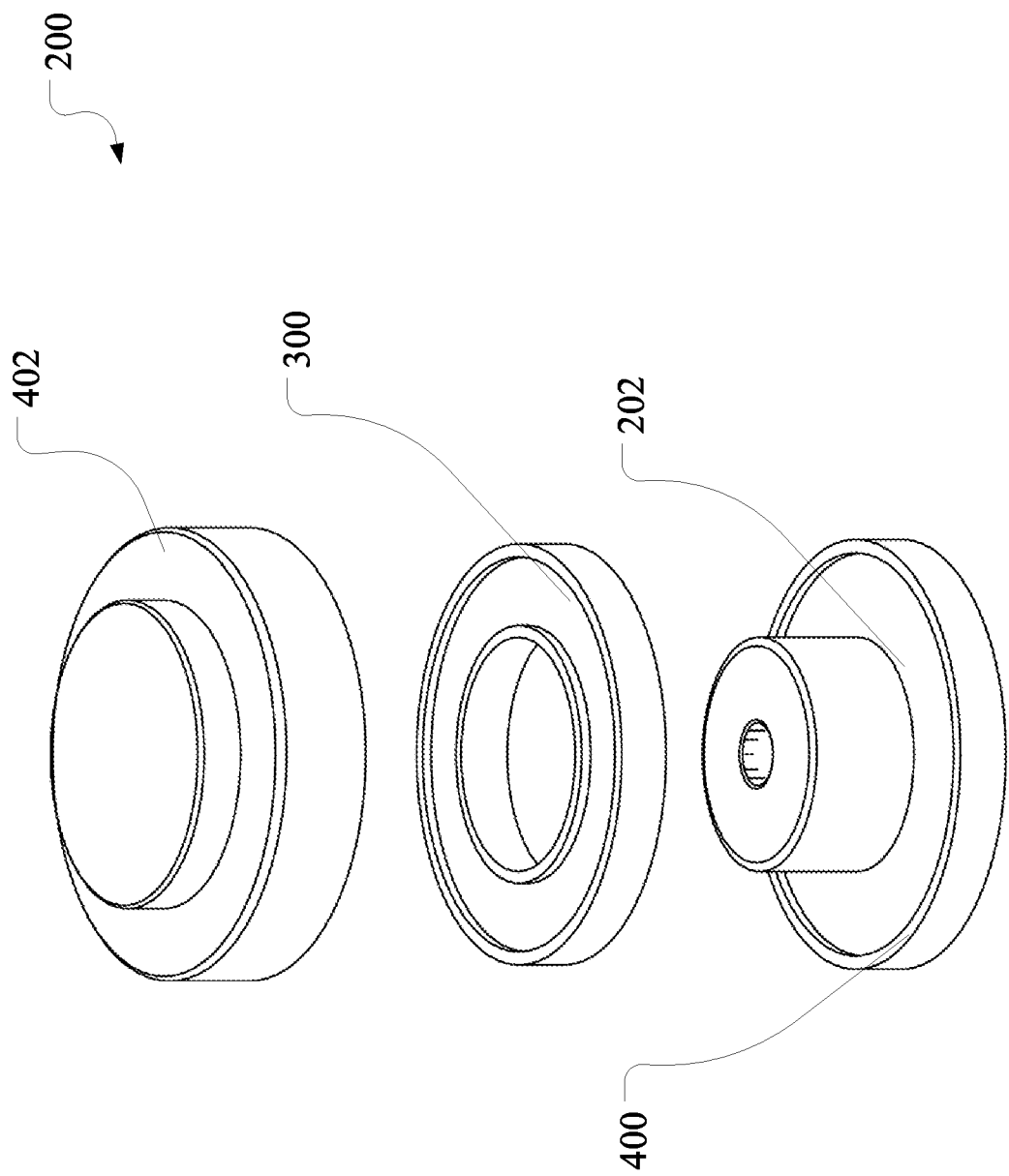
FIG. 4 shows an exploded perspective view of the sensor, in accordance with various aspects of the subject technology.

FIG. 4 shows an exploded perspective view of the sensor 200, in accordance with various aspects of the subject technology. The sensor 200 includes a substrate 202 for supporting the strain gauges. The substrate 202 can be integrated with a support structure 400. The sensor 200 includes the PCB 300. The PCB 300 is configured to fit around an extension of the support structure 400 to contact the substrate 202. The sensor 200 also includes a protective housing 402 to contain the support structure 400 with the substrate 202 and the PCB 300, when the PCB 300 is operationally coupled to the substrate 202. As shown in FIG. 4, the support structure 400 and the PCB 300 can be circular shaped with the same circumference to fit within the protective housing 402. While the support structure 400 and the PCB 300 are shown as circular shaped, in various embodiments, the support structure 400 and the PCB 300 can be an applicable shape. Specifically, the support structure 400 and the PCB 300 can be an applicable shape to allow the PCB 300 to fit within the support structure 400. The support structure 400 and/or the protective housing 402 can be secured within the downhole tool, e.g. a collar of the downhole tool. In turn, either or both the support structure 400 and the protective housing 402 can transfer loads on the downhole tool, e.g. from the collar, to the sensor 200. Accordingly, the loads can be transferred to the substrate 202 through either or both the protective housing 402 and the support structure 400, where the strain gauges can measure the transferred loads.

Figure 5:
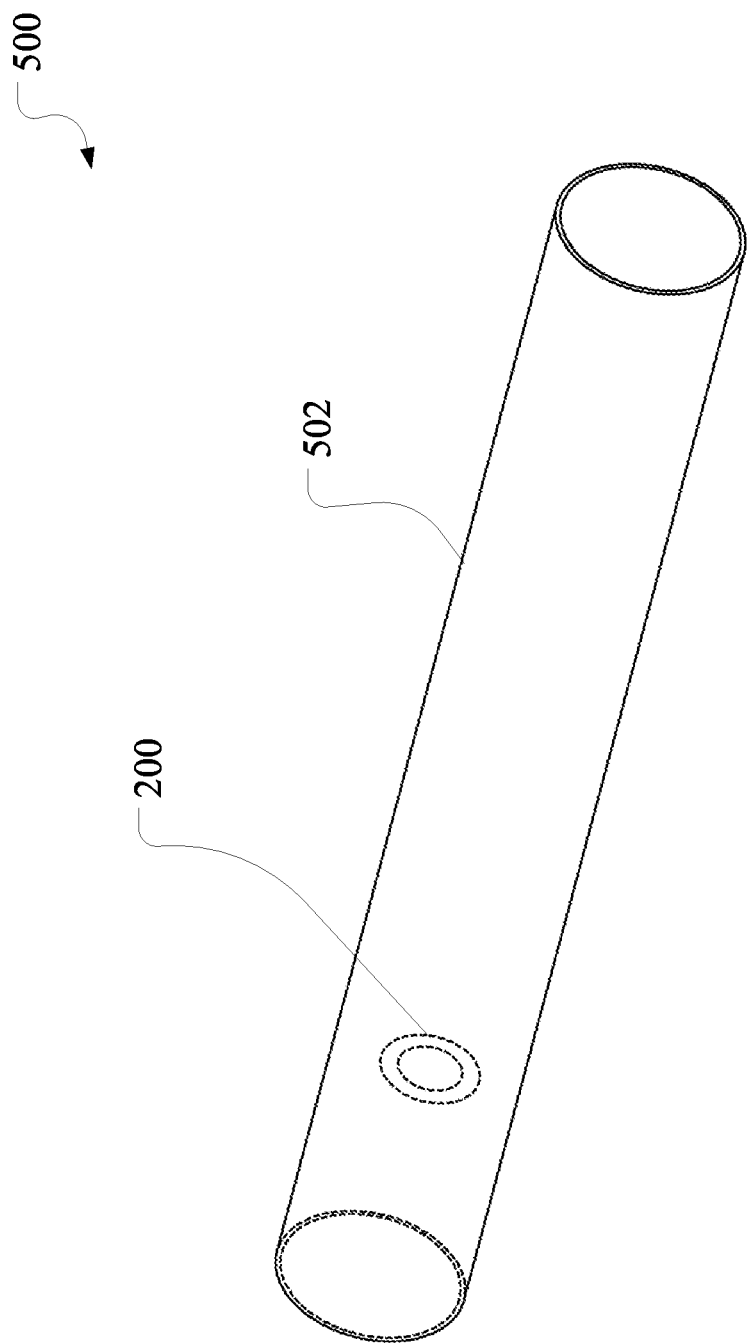
FIG. 5 shows a perspective view of a downhole tool integrating the sensor 200, in accordance with various aspects of the subject technology.

FIG. 5 shows a perspective view of a downhole tool 500 integrating the sensor 200, in accordance with various aspects of the subject technology. The downhole tool 500 includes a collar 502. The sensor 200 is secured within the collar 502, e.g. along a side of the collar. The sensor 200 can be secured within the collar 502 through an applicable mechanism. For example, the sensor 200 can be secured within the collar 502 through tight friction within a cavity of the collar 502, e.g. through the housing and/or the support structure of the sensor 200 tightly fitting within the cavity of the collar 502. The loads exerted on the downhole tool 500 can be exerted on the collar 502 where they are directly transferred to the sensor 200 through the tight friction used to secure the sensor 200 within the cavity of the collar 502. As follows, the loads transferred to the sensor 200 can be transferred to the substrate of the sensor 200, where the strain gauges can measure the transferred loads, e.g. the axial and torsional loads.

Figure 6:
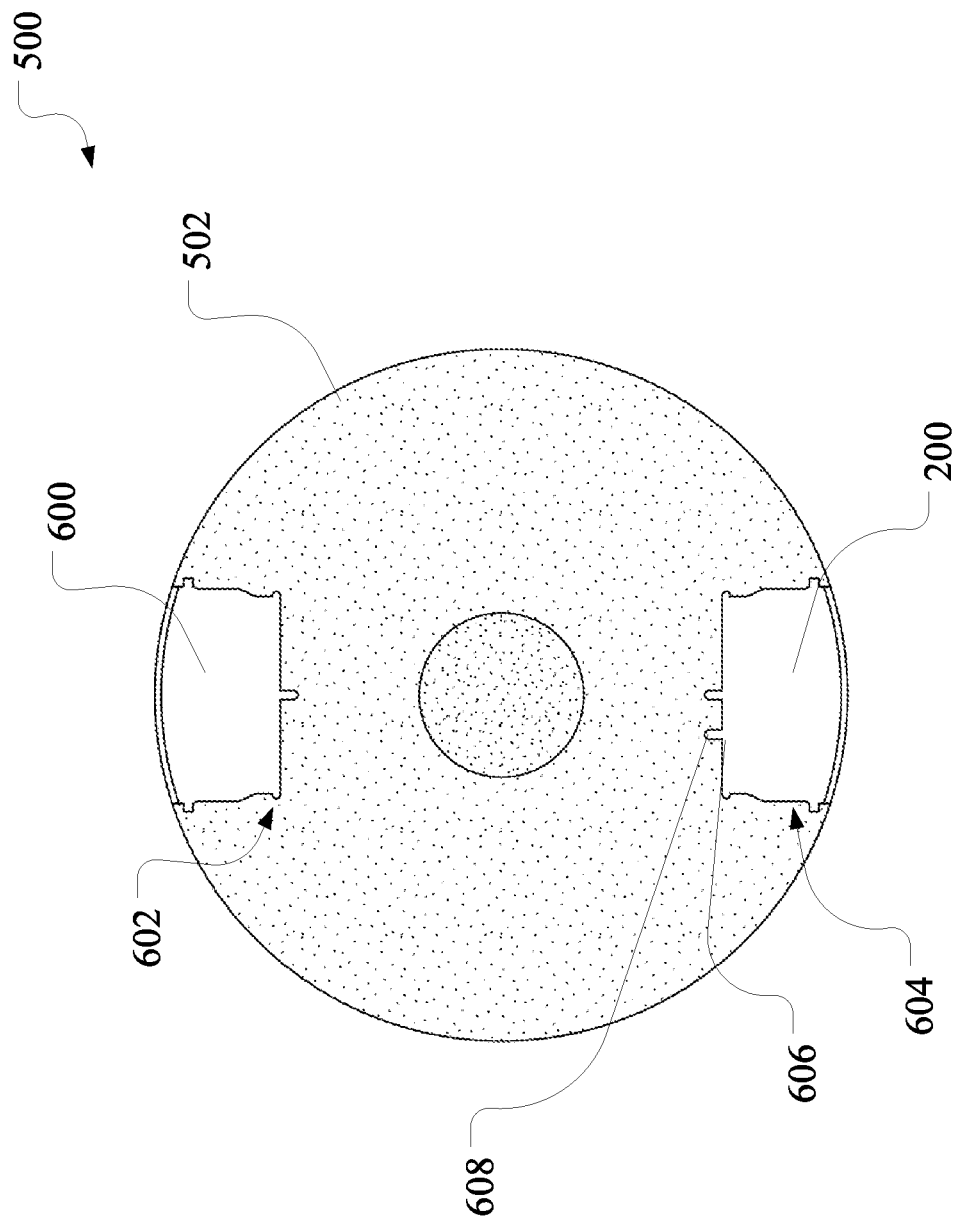
FIG. 6 shows a cross-sectional view of the downhole tool integrating two sensors for measuring operational characteristics of the downhole tool, in accordance with various aspects of the subject technology.

FIG. 6 shows a cross-sectional view of the downhole tool 500 integrating two sensors for measuring operational characteristics of the downhole tool 500, in accordance with various aspects of the subject technology. The downhole tool 500 includes a first sensor 200 secured within the collar 502. Further, the downhole tool 500 also includes a second sensor 600 secured within the collar 502. The second sensor 600 can be of the same design as the first sensor 200. Specifically, the second sensor 600 can include eight strain gauges that form two full-bridge strain gauges for measuring axial loads and torsional loads on the collar 502.

The two sensors 200 and 600 are secured at opposing positions on the collar 502. Specifically, the two sensors 200 and 600 are positioned 180° apart around a circumference of the collar 502. In being implemented at opposing positions on the collar 502, the sensors 200 and 600 can measure axial and torsional loads at the opposing positions on the collar 502. In turn, the measured axial and torsional loads at the opposing positions on the collar 502 can be used to measure bending moments of the collar 502 and the downhole tool. Specifically, as the axial and torsional loads are measured at positions 180° apart on the collar 502, the measured loads can be used to identify bending moments of the collar 502. An applicable technique can be used to measure bending moments from the measured axial and torsional loads. For example, Azimuthal binning can be used to measure bending moments of the collar 502 from the measured axial and torsional loads. While only two sensors 200 and 600 are shown in FIG. 6, in various embodiments, the downhole tool 500 can include only one sensor or more than two sensors. For example, the downhole tool 500 can include three or more sensors for measuring bending moments of the downhole tool 500.

Measured bending moments can indicate health of the downhole tool 500 and components of the downhole tool 500. Specifically, as the downhole tool 500 experiences wear and tear, the bending moments of the downhole tool 500 are reduced. This can be problematic during operation of the downhole tool 500. Specifically, wellbores are often planned with curvatures, also known as dog legs. When the downhole tool 500 is drilling along the curve, it is desirable that the downhole tool 500 is able to bend in order to drill along the curve. However, when the downhole tool 500 wears and is unable to bend as much, as indicated by measured bending moments, it is difficult to achieve the proper curve of the planned wellbore.

The collar 502 includes receiving cavities 602 and 604 for receiving the sensors 200 and 600 and securing the sensors 200 and 600 to the collar 502. The sensors 200 and 600 can include one or more pins, e.g. pin 606, that extend out of the sensors 200 and 600. The cavities 602 and 604 can include recessions for receiving the pins when the sensors 200 and 600 are positioned within the cavities 602 and 604. The pins can extend out from the sensors 200 and 600 based on desired alignment positions of the sensors 200 and 600 within the cavities 602 and 604. Accordingly, when the sensors 200 and 600 are placed in the cavities 602 and 604 such that the pins are received by the respective recession in the collar 502, the sensors 200 and 600 can be at the desired alignment positions within the cavities 602 and 604. This can help to ensure that the sensors 200 and 600 are properly aligned within the collar 502. This is shown in FIG. 6, through the pin 606 that extends out from the first sensor 200 and into a recession 608 in the collar 502.

Having disclosed some example system components and concepts, the disclosure now turns to FIG. 7 which illustrates an example method for manufacturing a sensor for a downhole tool, in accordance with various aspects of the subject technology. The steps outlined herein are exemplary and can be implemented in any combination thereof, including combinations that exclude, add, or modify certain steps.

At operation 700, strain gauges are installed on a single substrate of a sensor for a downhole tool. The sensor can be configured to measure axial loads and torsional loads on a collar of the downhole tool when the sensor is secured to the collar. In turn, the sensor can measure one or more operational characteristics of the downhole tool during operation of the downhole tool.

At operation 702, the substrate is coupled to a metal support structure. In coupling the substrate to the metal support structure, e.g. a metal plate, the substrate can be rigidly secured to the metal support structure. For example, the substrate can be glued to the metal support structure.

At operation 704, wires are attached to the substrate for providing electrical connections to the plurality of strain gauges. Specifically, the wires can be attached for configuring the plurality of strain gauges to measure the axial loads and the torsional loads on the collar.

At operation 706, a PCB including electronics for controlling operation of the sensor is connected to the wires. In turn, the electronics can be electrically connected to the plurality of strain gauges through the wires. The electronics can configure and control operation of the strain gauges to measure axial loads and the torsional loads on the collar.

At operation 708, the PCB is physically connected to the substrate. Specifically, the PCB can be positioned to physically contact the substrate as part of physically connecting the PCB to the substrate.

At operation 710, the electronics and the plurality of strain gauges are concurrently calibrated as part of calibrating the sensor. Specifically, one or more calibration tests can be applied to the strain gauges and the electronics to identify calibration parameters of the strain gauges. In turn, the calibration parameters can be used to calibrate and control the strain gauges for operation.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logic blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrative embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statemet 1. A downhole tool comprising a drill motor; a collar; and one or more sensors secured to the collar for measuring one or more operational characteristics of the downhole tool including performance characteristics of the drill motor during operation of the downhole tool, the one or more sensors including a first sensor including: a first substrate and a plurality of strain gauges disposed on the first substrate and configured to measure axial strains and torsional strains on the collar that are transferred to the first substrate for measuring the one or more operational characteristics of the downhole tool including the performance characteristics of the drill motor.

Statemet 2. The downhole tool of statement 1, wherein the one or more operational characteristics of the downhole tool include a torque-on-bit of the downhole tool and the performance characteristics of the drill motor are determined from the measured torque-on-bit of the downhole tool.

Statemet 3. The downhole tool of Statemet 1 or 2, wherein the measured torque-on-bit of the downhole tool is compared to a known operational torque of the drill motor to identify the performance characteristics of the downhole tool.

Statemet 4. The downhole tool of Statements 1 through 3, wherein the known operational torque of the drill motor is identified during operation of the downhole tool based on weight on bit and corresponding pressure drop within a wellbore in which the downhole tool is operating.

Statemet 5. The downhole tool of Statements 1 through 4, wherein the first sensor further comprises a printed circuit board (PCB) positioned within the first sensor in proximity to the first substrate and the plurality of strain gauges disposed on the first substrate, wherein the PCB includes electronics for controlling operation of the first sensor in measuring the one or more operational characteristics of the downhole tool.

Statemet 6. The downhole tool of Statements 1 through 5, wherein the plurality of strain gauges includes eight strain gauges disposed on the first substrate and circumferentially spaced apart at 45° + or − a range of 10° and thereby forming two full-bridge strain sensors within the first sensor.

Statemet 7. The downhole tool of Statements 1 through 6, further comprising one or more additional sensors including at least a second sensor secured to the collar for measuring the one or more operational characteristics of the downhole tool during operation of the downhole tool, the second sensor including a second sensor substrate and a second plurality of strain gauges disposed on the second sensor substrate and configured to measure the axial strains and torsional strains on the collar for measuring the one or more operational characteristics of the downhole tool.

Statemet 8. The downhole tool of Statements 1 through 7, wherein the first sensor and the second sensor are secured at opposing positions along a circumference of the collar separated by 180° around the circumference of the collar.

Statemet 9. The downhole tool of Statements 1 through 8, wherein the one or more operational characteristics of the downhole tool include a bending moment of the downhole tool determined from measurements made by the first sensor and the second sensor based on positioning of the first sensor and the second sensor at the opposing positions separated by 180° along the circumference of the collar and wherein the performance characteristics of the drill motor is measured based, at least in part, on the bending moment.

Statemet 10. A sensor of a downhole tool comprising a substrate configured for positioning on a collar of the downhole tool; and a plurality of strain gauges disposed on the substrate and configured to measure axial strains and torsional strains on the collar that are transferred to the substrate for measuring one or more operational characteristics of the downhole tool including performance characteristics of a motor.

Statemet 11. The sensor of the downhole tool of Statemet 10, wherein the motor is a drill motor.

Statemet 12. The sensor of the downhole tool of Statements 10 through 11, wherein the one or more operational characteristics of the downhole tool include a torque-on-bit of the downhole tool and the performance characteristics of the motor are determined from the measured torque-on-bit of the downhole tool.

Statement 13. The sensor of the downhole tool of Statements 10 through 12, wherein the measured torque-on-bit of the downhole tool is compared to a known operational torque of the motor to identify the performance characteristics of the downhole tool.

Statemet 14. The sensor of the downhole tool of Statements 10 through 13, wherein the known operational torque of the motor is identified during operation of the downhole tool based on weight on bit and corresponding pressure drop within a wellbore in which the downhole tool is operating.

Statemet 15. The sensor of the downhole tool of Statements 10 through 14, further comprising a printed circuit board (PCB) positioned in proximity to the substrate and the plurality of strain gauges disposed on the substrate, wherein the PCB includes electronics for measuring the one or more operational characteristics of the downhole tool.

Statemet 16. A downhole tool comprising a collar; and a sensor secured to the collar for measuring one or more operational characteristics of the downhole tool including performance characteristics of a motor during operation of the downhole tool, the sensor including a substrate, and a plurality of strain gauges disposed on the substrate and configured to measure axial strains and torsional strains on the collar that are transferred to the substrate for measuring the one or more operational characteristics of the downhole tool including the performance characteristics of the motor.

Statemet 17. The downhole tool of Statemet 16, wherein the motor is a mud motor.

Statemet 18. The downhole tool of Statements 16 through 17, wherein the one or more operational characteristics of the downhole tool include a torque-on-bit of the downhole tool and the performance characteristics of the motor are determined from the measured torque-on-bit of the downhole tool.

Statemet 19. The downhole tool of Statements 16 through 18, wherein the measured torque-on-bit of the downhole tool is compared to a known operational torque of the motor to identify the performance characteristics of the downhole tool, and wherein the known operational torque of the motor is identified during operation of the downhole tool based on weight on bit and corresponding pressure drop within a wellbore in which the downhole tool is operating.

Statemet 20. The downhole tool of Statements 16 through 20, wherein the sensor further comprises a printed circuit board (PCB) positioned within the sensor in proximity to the substrate and the plurality of strain gauges disposed on the substrate, wherein the PCB includes electronics for controlling operation of the sensor in measuring the one or more operational characteristics of the downhole tool.

What is claimed is:

1. A downhole tool comprising:
  a drill motor;
  a collar; and
  one or more sensors secured within the collar for measuring one or more operational characteristics of the downhole tool including performance characteristics of the drill motor during operation of the downhole tool, the one or more sensors including a first sensor including:
    a first substrate,
    a plurality of strain gauges integrated into the first substrate and configured to measure axial strains and torsional strains on the collar that are transferred to the first substrate for measuring the one or more operational characteristics of the downhole tool including the performance characteristics of the drill motor;
    a printed circuit board (PCB) positioned within the first sensor in proximity to the plurality of strain gauges and integrated into the first substrate, wherein the PCB includes electronics electrically coupled to the plurality of strain gauges and configured to concurrently calibrate the plurality of strain gauges on the first substrate based on a predetermined calibration parameter and control operation of the first sensor in measuring the one or more operational characteristics of the downhole tool; and
    a temperature sensor disposed on the PCB within the first sensor in proximity to the plurality of strain gauges and integrated into the first substrate, wherein the temperature sensor is configured to measure temperature at the plurality of strain gauges and the plurality of strain gauges is controlled based at least in part on the temperature at the plurality of strain gauges.

2. The downhole tool of claim 1, wherein the one or more operational characteristics of the downhole tool include a torque-on-bit of the downhole tool and the performance characteristics of the drill motor are determined from the measured torque-on-bit of the downhole tool.

3. The downhole tool of claim 2, wherein the measured torque-on-bit of the downhole tool is compared to a known operational torque of the drill motor to identify the performance characteristics of the downhole tool.

4. The downhole tool of claim 3, wherein the known operational torque of the drill motor is identified during operation of the downhole tool based on weight on bit and corresponding pressure drop within a wellbore in which the downhole tool is operating.

5. The downhole tool of claim 1, wherein the plurality of strain gauges includes eight strain gauges integrated into the first substrate and circumferentially spaced apart at 45° + or − a range of 10° and thereby forming two full-bridge strain sensors within the first sensor.

6. The downhole tool of claim 1, further comprising:
  one or more additional sensors including at least a second sensor secured to the collar for measuring the one or more operational characteristics of the downhole tool during operation of the downhole tool, the second sensor including:
    a second sensor substrate, and
    a second plurality of strain gauges integrated into the second sensor substrate and configured to measure the axial strains and torsional strains on the collar for measuring the one or more operational characteristics of the downhole tool.

7. The downhole tool of claim 6, wherein the first sensor and the second sensor are secured at opposing positions along a circumference of the collar separated by 180° around the circumference of the collar.

8. The downhole tool of claim 7, wherein the one or more operational characteristics of the downhole tool include a bending moment of the downhole tool determined from measurements made by the first sensor and the second sensor based on positioning of the first sensor and the second sensor at the opposing positions separated by 180° along the circumference of the collar and wherein the performance characteristics of the drill motor is measured based, at least in part, on the bending moment.

9. The downhole tool of claim 1, wherein the electronics included in the PCB are configured to control the plurality of strain gauges based on the temperature measured at the plurality of strain gauges.

10. A sensor of a downhole tool comprising:
  a substrate configured for positioning within a collar of the downhole tool;
  a plurality of strain gauges integrated into the substrate and configured to measure axial strains and torsional strains on the collar that are transferred to the substrate for measuring one or more operational characteristics of the downhole tool including performance characteristics of a motor;
a printed circuit board (PCB) positioned within the sensor in proximity to the plurality of strain gauges and integrated into the substrate, wherein the PCB includes electronics electrically coupled to the plurality of strain gauges and configured to concurrently calibrate the plurality of strain gauges on the substrate based on a predetermined calibration parameter and control operation of the sensor in measuring the one or more operational characteristics of the downhole tool; and
a temperature sensor disposed on the PCB within the sensor in proximity to the plurality of strain gauges and integrated into the substrate, wherein the temperature sensor is configured to measure temperature at the plurality of strain gauges and the plurality of strain gauges is controlled based at least in part on the temperature at the plurality of strain gauges.

11. The sensor of the downhole tool of claim 10, wherein the motor is a drill motor.

12. The sensor of the downhole tool of claim 10, wherein the one or more operational characteristics of the downhole tool include a torque-on-bit of the downhole tool and the performance characteristics of the motor are determined from the measured torque-on-bit of the downhole tool.

13. The sensor of the downhole tool of claim 12, wherein the measured torque-on-bit of the downhole tool is compared to a known operational torque of the motor to identify the performance characteristics of the downhole tool.

14. The sensor of the downhole tool of claim 13, wherein the known operational torque of the motor is identified during operation of the downhole tool based on weight on bit and corresponding pressure drop within a wellbore in which the downhole tool is operating.

15. A downhole tool comprising:
a collar; and
a sensor secured within the collar for measuring one or more operational characteristics of the downhole tool including performance characteristics of a motor during operation of the downhole tool, the sensor including:
a substrate;
a plurality of strain gauges integrated into the substrate and configured to measure axial strains and torsional strains on the collar that are transferred to the substrate for measuring the one or more operational characteristics of the downhole tool including the performance characteristics of the motor;
a printed circuit board (PCB) positioned within the sensor in proximity to the plurality of strain gauges and integrated into the substrate, wherein the PCB includes electronics electrically coupled to the plurality of strain gauges and configured to concurrently calibrate the plurality of strain gauges on the substrate based on a predetermined calibration parameter and control operation of the sensor in measuring the one or more operational characteristics of the downhole tool; and
a temperature sensor disposed on the PCB within the sensor in proximity to the plurality of strain gauges and integrated into the substrate, wherein the temperature sensor is configured to measure temperature at the plurality of strain gauges and the plurality of strain gauges is controlled based at least in part on the temperature at the plurality of strain gauges.

16. The downhole tool of claim 15, wherein the motor is a mud motor.

17. The downhole tool of claim 15, wherein the one or more operational characteristics of the downhole tool include a torque-on-bit of the downhole tool and the performance characteristics of the motor are determined from the measured torque-on-bit of the downhole tool.

18. The downhole tool of claim 17, wherein the measured torque-on-bit of the downhole tool is compared to a known operational torque of the motor to identify the performance characteristics of the downhole tool, and wherein the known operational torque of the motor is identified during operation of the downhole tool based on weight on bit and corresponding pressure drop within a wellbore in which the downhole tool is operating.

* * * * *